(12) United States Patent
Audebert

(10) Patent No.: US 6,308,268 B1
(45) Date of Patent: Oct. 23, 2001

(54) PORTABLE ELECTRONIC DEVICE FOR SAFE COMMUNICATION SYSTEM, AND METHOD FOR INITIALIZING ITS PARAMETERS

(75) Inventor: Yves Louis Gabriel Audebert, Los Gatos, CA (US)

(73) Assignee: Activcard, Suresnes Cedex (FR)

( * ) Notice: Subject to any disclaimer, the term of this patent is extended or adjusted under 35 U.S.C. 154(b) by 0 days.

(21) Appl. No.: 09/506,587

(22) Filed: Feb. 18, 2000

Related U.S. Application Data

(63) Continuation of application No. PCT/FR98/01820, filed on Aug. 21, 1997.

(30) Foreign Application Priority Data

Aug. 21, 1997 (FR) .................................................. 97 10548

(51) Int. Cl.$^7$ ........................................................ G06F 1/24
(52) U.S. Cl. ........................ 713/182; 713/171; 380/255; 380/277
(58) Field of Search .................................. 713/171, 182; 380/255, 277, 283, 285

(56) References Cited

U.S. PATENT DOCUMENTS

| 5,014,312 | 5/1991 | Lisimaque et al. . |
| 5,900,606 | 5/1999 | Rigal et al. . |

FOREIGN PATENT DOCUMENTS

| 3927270 | 2/1991 | (DE) . |
| 0173103 | 3/1986 | (EP) . |
| 0325506 | 7/1989 | (EP) . |
| 0610886 | 8/1994 | (EP) . |
| 2206431 | 1/1989 | (GB) . |
| WO9310509 | 5/1993 | (WO) . |
| WO9628796 | 9/1996 | (WO) . |

OTHER PUBLICATIONS

Menezes, "Handbook of Applied Cryptography", 1996, pp. sec. 10.2, iii, sec. 13.34, iii.*
Schneier, "Applied Cryptography", 1995, entire book.*
International Search Report for PCT/FR98/01820.

* cited by examiner

Primary Examiner—Thomas R. Peeso
(74) Attorney, Agent, or Firm—Stevens, Davis, Miller & Mosher, LLP

(57) ABSTRACT

This device includes data storage unit, interface unit with an external tool for loading data into the storage unit, data processing unit including initialization unit for enabling modification of a specific secret personalizing access code and loading of personalizing data into the storage unit, first loading unit controlled by the specific access code for loading into the storage unit reprogrammable particular secret personalizing access codes assigned to personalizing in the device a plurality of functions, second loading unit controlled by the particular access codes for loading into the storage unit particular personalizing data assigned to the implementation of the functions, and inhibitor unit for authorizing, for each of the functions, only in response to the application of one particular access code already assigned to the function, (i) modification of the particular access code and (ii) the loading of the particular personalizing data.

21 Claims, 5 Drawing Sheets

PORTABLE ELECTRONIC DEVICE FOR SAFE COMMUNICATION SYSTEM, AND METHOD FOR INITIALIZING ITS PARAMETERS

This application is a continuation of international PCT application No. PCT/FR98/01820 filed Aug. 21, 1997.

FIELD OF THE INVENTION

The present invention relates generally to secure electronic communication systems and more particularly to systems of this kind in which portable secure electronic devices are used to set up a call or communication to and/or to access another electronic unit.

BACKGROUND OF THE INVENTION

Many electronic communication systems require access of users to particular applications to be controlled, such control generally entailing authenticating persons and/or messages. This is the case in particular when it is a question of controlling access to a computer or more generally a data processing network whose use is reserved to duly authorized persons. Such networks can be used, for example, to provide all kinds of services involving a transaction, usually with an economic consideration, such as telepurchasing, pay-per-view television, home banking, interactive video games, etc.

Access control systems of this kind are described in particular in documents U.S. Pat. Nos. 3,806,874, 4,601,011, 4,720,860, 4,800,590 and 5,060,263. The systems described in the above documents use a portable secure electronic device which generates a password by encrypting a variable. A verification unit performs the same calculation or a similar calculation on the same or approximately the same variable and authorizes access to the requested application if the passwords generated in the portable device and the verification unit match. The variable can be a random or pseudo-random number, referred to hereinafter as a die, transmitted from the verification unit to the portable device, or it can be generated independently in the portable device and in the verification unit by means of a clock and/or an event counter, for example.

If the encryption process used in the portable device and the verification unit uses a symmetrical algorithm and a secret key, for example the DES (Data Encryption Standard) algorithm, the security of the system relies on the preservation of the secret character of the key stored both in the portable device and in the verification unit.

In some cases, the key can be static, i.e. it retains the same value throughout the service life of the portable device.

In other cases, the key can be dynamic, i.e. it changes in time as a function of the content of a counter incremented by a clock signal and/or an event counter, for example.

Whether the key is static or dynamic, it must initially, i.e. when the device is personalized, have a particular value which is stored both in the portable electronic device and in a database associated with the verification unit. When a user requests access, he or she must one way or another, for example using a public identification number or a personal identification number (PIN), identify himself or herself to the verification unit which obtains from the database the static key or, in the case of a dynamic key, the information that may be needed to calculate the current key.

Security problems of a similar kind arise in secure electronic communication systems using portable electronic devices and verification units employing encryption and decryption by means of asymmetric algorithms with public and private keys. The mechanisms used by an algorithm of the above kind (authentication, signature, etc) are such that the secret character of one or more of the keys stored in the devices and/or the verification units must be conserved.

During the personalizing process the key(s) and other secret personalizing data are loaded into memory in the device by the entity which supplies the device to the end user. Protecting the personalizing data by enabling the supplier of a smart card to substitute a new master key controlling access to the personalizing data for the initial key installed by the card manufacturer is well known in the art, in particular from document WO 93/10509.

What is more, the rapid expansion of secure electronic communication systems is leading to the design of products for implementing a number of different applications and having a number of different security levels for the same application. The problem then arises of guaranteeing the independence of the applications and the associated security levels, i.e. the various functions implemented by the device.

One object of the invention is to provide a secure portable electronic device for communication with another electronic unit which is capable of assuring this independence of the functions.

SUMMARY OF THE INVENTION

To this end, the invention concerns a portable electronic device for secure communication with at least one electronic unit for use of a plurality of functions, including:

data storage means, interface means with at least one external tool for loading data into said storage means, data processing means including initialization means for enabling, in response to the application of a secret personalizing access code specific to said device, modification of said specific secret personalizing access code and loading of personalizing data into said storage means, first loading means controlled by said specific secret personalizing access code for loading into said storage means reprogrammable particular secret data respectively representative of different particular secret personalizing access codes, each said particular secret personalizing access code being assigned to personalizing in said device a particular one of said functions, second loading means controlled by said particular secret personalizing access codes for loading into said storage means particular personalizing data assigned to the implementation of said functions by said processing means, and inhibitor means for authorizing, for each said functions, only in response to the application of one said particular secret personalizing access codes already assigned to said function, (i) modification of one said reprogammable particular secret data loaded into said storage means and representative of said particular secret personalizing access code and (ii) said loading of said particular personalizing data.

According to one feature of the invention, said inhibitor means comprise means to prohibit read mode access to any of said secret data.

According to another feature of the invention, said inhibitor means comprise means to prohibit read mode and write mode access by said processing means to said particular personalizing data by means of said specific secret personalizing access code.

According to one embodiment of the invention, said inhibitor means comprise means to prohibit read mode access to said particular personalizing data following the loading of said data by means of said particular secret personalizing access codes assigned to said functions.

Alternatively, according to another embodiment of the invention, said inhibitor means comprise means to authorize, for each said functions, read mode access to said particular personalizing data assigned to the implementation of said function by means of one said particular secret personalizing access codes assigned to said function.

According to another feature of the invention, said processing means comprise means to authorize, by means of said specific secret personalizing access code, the deletion of said reprogrammable particular secret data and of said particular personalizing data once loaded into said storage means and the loading of new reprogrammable particular secret data.

According to another feature of the invention, said specific secret personalizing access code is an access code for loading into said storage means common personalizing data which are common to all said functions of said device.

According to another feature of the invention, said device includes third loading means for loading into said storage means a reprogrammable specific secret datum representative of said specific secret personalizing access code, said initialization means comprising means to authorize the replacement of said reprogrammable specific secret datum by a new specific secret datum representative of a new specific secret personalizing access code only in response to the application to said processing means of said specific secret personalizing access code imaging said reprogrammable specific secret datum to be replaced.

According to another feature of the invention, said storage means include at least one non-volatile memory in which a base secret key is stored and said initialization means include first calculating means for calculating an initial value of said reprogrammable specific secret datum as a function of said base secret key and of an initial secret parameter.

According to another feature of the invention, each said secret datum is a calculation secret key for calculating a verification code for verifying one of said personalizing access codes applied to said device.

According to another feature of the invention, said processing means include second calculating means for calculating said verification code by encrypting a variable by means of said calculation secret key.

According to another feature of the invention, said particular personalizing data includes at least one plurality of authentication secret keys which are different from each other and each of which is assigned to one of said functions and said processing means include calculating means for calculating an authentication code vis-à-vis a verification unit as a function of one of said authentication secret keys.

The invention also provides a method of initializing a portable electronic device for secure communication with at least one electronic unit for use of a plurality of functions, said portable electronic device including:

data storage means, interface means with at least one external tool for loading data into said storage means, data processing means including initialization means for enabling, in response to the application of a secret personalizing access code specific to said device, modification of said specific secret personalizing access code and loading of personalizing data into said storage means, first loading means controlled by said specific secret personalizing access code for loading into said storage means reprogrammable particular secret data respectively representative of different particular secret personalizing access codes and each assigned to personalizing in said device a particular one of said functions, second loading means controlled by said particular secret personalizing access codes for loading into said storage means particular personalizing data assigned to the implementation of said functions by said processing means, and inhibitor means for authorizing, for each said functions, only in response to the application of one said particular secret personalizing access codes already assigned to said function, (i) modification of one said reprogammable particular secret data loaded into said storage means and representative of said particular secret personalizing access code and (ii) said loading of said particular personalizing data, wherein said method includes:

an initialization step of defining and storing in said storage means a reprogrammable specific personalizing secret key specific to said device, a first personalizing step of loading into said storage means, by means of said specific secret personalizing access code dependent on said reprogrammable specific personalizing secret key, common personalizing data which are common to said functions and reprogrammable particular secret keys for calculating said particular secret personalizing access secret codes each assigned to one of said functions, and a second personalizing step of loading said particular personalizing data relating to each said functions into said storage means by means of said particular secret personalizing access code assigned to personalizing said function.

Preferably, said second personalizing step includes a phase consisting in, when loading said particular personalizing data relative to at least one of said functions, modifying said reprogrammable particular secret key for calculating said particular secret personalizing access code assigned to said function.

According to one feature of the invention, said initialization step includes:

at least one first initialization phase consisting in defining at least one common secret datum which is common to a set of devices intended for a same entity, at least one second initialization phase including the steps of, for each device of said set:

a) reading a specific identification datum carried by said device, b) calculating a first specific personalizing secret key as a function of said common secret datum and said specific identification datum, c) storing said specific identification datum and said first specific personalizing secret key in said storage means.

According to another feature of the invention, said first pesonalizing step includes the following steps, for each device of said set:

a) extracting said specific identification datum from said device, b) calculating in a first external tool said first specific personalizing secret key as a function of said common secret datum and said specific identification datum, c) calculating in said first external tool a first specific secret personalizing access code as a function of said first specific personalizing secret key and a challenge transmitted by said device, d) transmitting from said first external tool to said device said first specific secret personalizing access code with personalizing parameters including a second specific personalizing secret key different from said first specific personalizing secret key, e) calculating in said device a verification code as a function of said first specific personalizing secret key and said challenge for verifying said first specific secret personalizing access code received from said first external tool, f) comparing in said device said first specific secret personalizing access code and said verification code and, in response to a match of said codes:

g) storing said personalizing parameters in said storage means, and h) substituting said second specific personalizing key for said first specific personalizing key in said storage means.

According to an embodiment of the invention, said initialization step includes a third initialization phase consisting in initially storing a common base secret key in a permanent memory of said storage means and steps a) and b) of said second initialization phase comprise:

applying said common secret datum and said common base secret key to a second external tool, reading said specific identification datum by means of said second external tool, calculating said specific personalizing secret key by means of said second external tool, encrypting said specific personalizing secret key by means of said common base secret key in said second external tool, transmitting the result of said encryption from said second external tool to said device, and decrypting said result in said device by means of said common base secret key to reconstitute said specific personalizing secret key.

According to another embodiment of the invention, said initialization step includes a third initialization phase consisting in initially storing a common base secret key in a permanent memory of said storage means, said first initialization phase equally consists in encrypting said common secret datum by means of said common base secret key and applying the result of said encryption to a second external tool, and said second initialization phase equally comprises:

a) reading said specific identification datum by means of said second external tool and transmitting said specific identification datum and the result of said encryption to said device, b) decrypting said result in said device by means of said common base secret key to restore said common secret datum and thereafter calculating said specific personalizing secret key.

The invention also provides a secure communication system comprising:

(a) a set of portable electronic devices for secure communication with at least one electronic unit for use of a plurality of functions, each said portable electronic device including:
data storage means,
interface means with at least one external tool for loading data into said storage means,
data processing means including initialization means for enabling, in response to the application of a secret personalizing access code specific to said device, modification of said specific secret personalizing access code and loading of personalizing data into said storage means,
first loading means controlled by said specific secret personalizing access code for loading into said storage means reprogrammable particular secret data respectively representative of different particular secret personalizing access codes and each assigned to personalizing in said device a particular one of said functions,
second loading means controlled by said particular secret personalizing access codes for loading into said storage means particular personalizing data assigned to the implementation of said functions by said processing means, and
inhibitor means for authorizing, for each said functions, only in response to the application of one said particular secret personalizing access codes already assigned to said function, (i) modification of one said reprogammable particular secret data loaded into said storage means and representative of said particular secret personalizing access code and (ii) said loading of said particular personalizing data,and (b) at least one external tool for initializing personalizing parameters for loading into each of said devices:
common personalizing data which are common to said functions of said device,
said particular personalizing data, and
said reprogrammable particular secret data.

According to one feature of the invention, said system further includes a production tool for the initial loading into each of said devices of a reprogrammable secret datum specific to each said devices and representative of said specific secret personalizing access code.

Finally, the invention also provides a secure communication system comprising:

(a) a set of portable electronic device for secure communication with at least one electronic unit for use of a plurality of functions, each said portable electronic device including:
data storage means,
interface means with at least one external tool for loading data into said storage means,
data processing means including initialization means for enabling, in response to the application of a secret personalizing access code specific to said device, modification of said specific secret personalizing access code and loading of personalizing data into said storage means,
first loading means controlled by said specific secret personalizing access code for loading into said storage means reprogrammable particular secret data respectively representative of different particular secret personalizing access codes and each assigned to personalizing in said device a particular one of said functions,
second loading means controlled by said particular secret personalizing access codes for loading into said storage means particular personalizing data assigned to the implementation of said functions by said processing means, said personalizing data including at least one plurality of authentication secret keys which are different from each other and each of which is assigned to one of said functions, and
inhibitor means for authorizing, for each said functions, only in response to the application of one said particular secret personalizing access codes already assigned to said function, (i) modification of one said reprogammable particular secret data loaded into said storage means and representative of said particular secret personalizing access code and (ii) said loading of said particular personalizing data, and (b) at least one verification unit, wherein said processing means include calculating means for calculating an authentication code vis-á-vis said verification unit as a function of one of said authentication secret keys.

DESCRIPTION OF THE DRAWINGS

Other features and advantages of the invention will emerge from the following description of embodiments of the invention given by way of example and illustrated by the accompanying drawings, in which.

DETAILED DESCRIPTION

Figure 1:
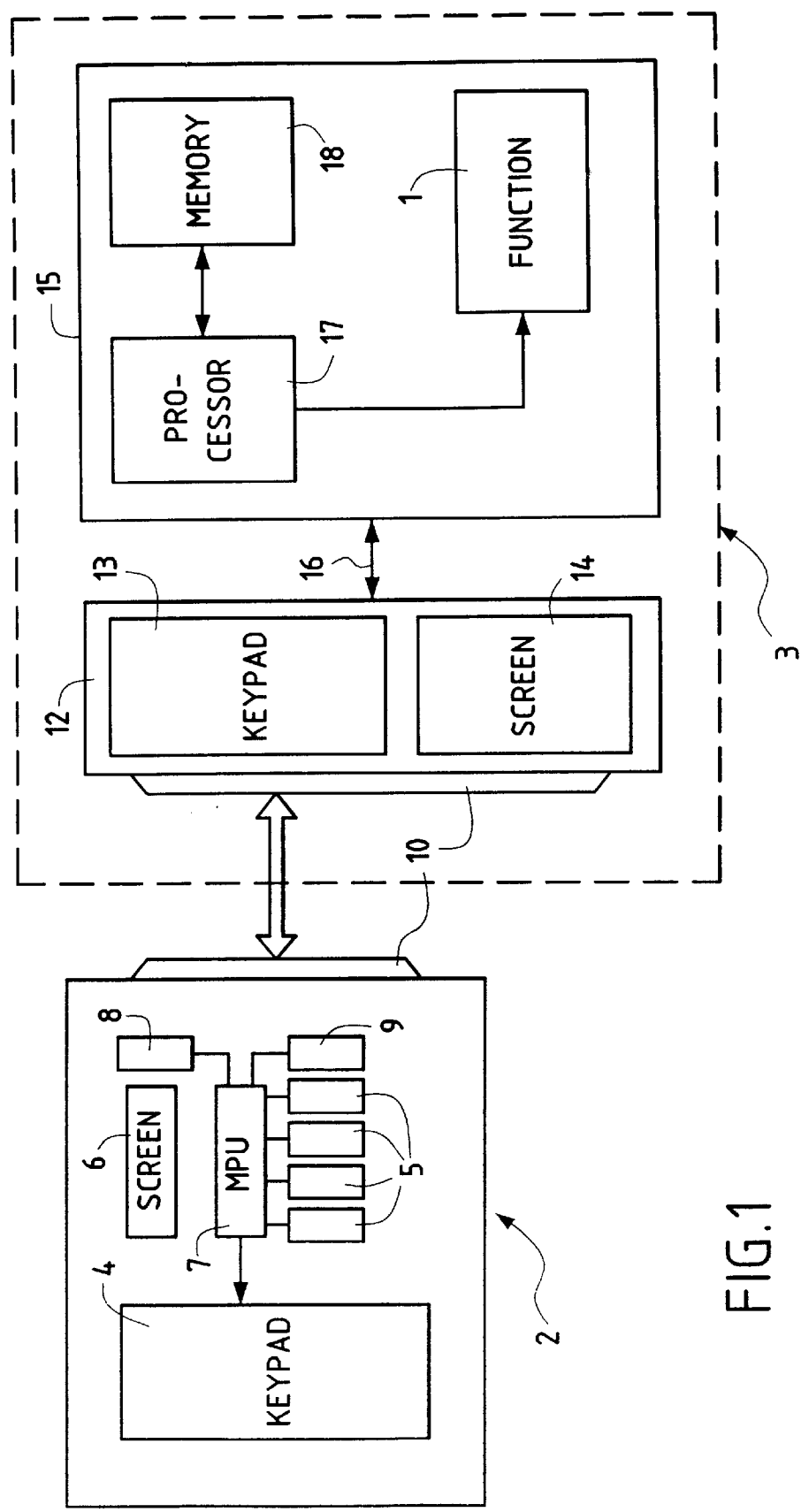
FIG. 1 is a general block diagram of a secure communication system in accordance with the invention applied to access control.

The access control system shown in FIG. 1 allows conditional access to an application symbolized by the rectangle 1. The term "application" must be understood in a very wide sense. It refers to any application to which access is conditional on authorization involving authentication implying verification of the device (card) by means of which the request is formulated, and preferably also identification of the person requesting access to the application, to determine if the request is legitimate.

The application can be of any kind, for example control of access to premises, to a data processing network or to a computer, execution of a pecuniary or other transaction (telepurchase, home banking, interactive video games, pay-per-view television, etc). Moreover, the authentication of persons and/or messages (electronic signature) is explicitly included within the scope of the present invention.

In the embodiment shown in FIG. 1, the access control system includes a first portable unit 2 referred to hereinafter as a "card" and at least one second verification unit 3. The access control system in accordance with the invention can include a large number of cards 2 and one or more verification units 3, but in all cases a number that is generally smaller. The numbers of cards 2 and units 3 are in no way limiting on the invention.

The card 2 is in the form of a pocket calculator or credit card, for example, and includes a keypad 4 for entering information, for example a personal identification number PIN, and various function keys 5. It also includes a display screen 6, for example a liquid crystal display screen, and an integrated electronic circuit including a programmed microcontroller 7, non-volatile read-only memory (ROM) 8 and reprogrammable memory 9 consisting of random access memory (RAM) and possibly electrically erasable programmable read-only memory (EEPROM). The non-volatile memory 8, the reprogrammable memory 9 and the data bus and the address bus of the microcontroller 7 are inaccessible from outside the card to make it impossible to read or modify information contained in the memories 8 and 9 fraudulently from outside the card.

The non-volatile memory (ROM) area 8 includes a program area and a data area.

The program area includes program instructions relating to the implementation of the following mechanisms:

1. Security Mechanisms carrier identification authentication of carrier by verification unit authentication of verification unit and personalizing unit authentication of message encryption/decryption possible electronic signature etc.

2. Personalizing Mechanisms in production at time of various personalizing operations by client(s)

3. Mechanisms Relating to Card Application(s)

4. Communication Mechanism communication with user: display, keypad communication with verification or personalizing unit infrared

DTMF communication with a reader communication with a smart card etc.

The data area includes data common to a fabrication mask:

1. ROM key ($K_{ROM}$)
2. software version number
3. etc.

The reprogrammable memory (RAM and possibly EEPROM) area 9 stores the following information:

1. Data Entered During the Various Phases of Initializing Production Parameters and Personalizing Parameters The data is structured according to the security levels and the applications and modification of a data area is conditional on authentication of the entity requesting personalizing: access code as a function of a challenge generated by the card, signature, etc.

This data can be secret (secret keys) or read-only data, and includes:

personalizing secret keys secret keys relating to security mechanisms: entity authentication, message authentication, challenge generation data relating to application: content of messages, types of security mechanism required, etc.

data relating to use of card in a given application: required length of personal identification number (PIN), challenge length, access code format, etc.

data common to all applications: PIN value, clock value, counter values, content of standard messages.

2. Working Data

The card 2 can include a communication system 10 for communicating with the verification unit 3 or with a production tool or a personalizing tool, as described below, either directly or via a transmission link of greater or lesser length. The communication system 10 can take various forms, for example a bidirectional cable link, a bidirectional DTMF telephone link, a bidirectional infrared link, a bidirectional "connected mode" link in which the card is inserted into an appropriate reader, optical reception means associated, in the unit 3, with means for reading information displayed on the screen 6, as described for example in document EP-A-0 399 897, or any other transmission system well known in the art.

Finally, an electrical power supply (not shown), for example a small electrical storage battery, is provided to power the various circuits of the card 2 and to render it autonomous.

The unit 3 includes interface means enabling it to communicate with the card 2 by means of the communication system 10. The interface means, symbolized by a rectangle 12, can take numerous forms, for example a dedicated reader, a computer terminal, a personal computer connected into a network, etc. The particular feature of the interface means 12 is that they enable communication with the associated card(s) 2 via the communication system 10.

The interface means 12 can also include a keypad 13 and a display screen 14 to enable a user to enter information to be communicated to a part 15 of the unit 3, for example passwords or data to be authenticated relating to the application 1. However, this data can be entered in other ways, in particular automatically, without manual intervention by the user, for example merely by inserting the card 2 into the interface 12 or by the emission of modulated infrared beams commanded by one of the function keys 5.

The interface 12 communicates with a part 15 of the unit 3 referred to as the "server". This communication, symbolized by the connection 16, can be over a short distance or a long distance and use any appropriate means. The information carried by this connection includes the password to be checked in the server 15 and possibly data to be authenticated and used in the server.

The server 15 includes a processor 17 and a memory 18. The processor 17 is capable of conditionally releasing the applications 1 referred to in access requests formulated by the cards 2.

The microcontroller 7 of the card 2 is programmed to assure the security of the call in the widest sense, in conjunction with the verification unit 3, for example authentication of a user holding the card 2, certification of messages, securing of transactions, etc. These authentication, certification, etc mechanisms are well known to the skilled person and will not be described in detail in this application. These mechanisms use encryption and/or decryption in the card 2 and/or in the unit 3 of one or more items of information by means of a public key and private key algorithm or a secret key algorithm, which keys are stored in the programmable memory 9 associated with the microcontroller 7 and/or in the memory 18 of the "server" 15.

In the following description, the invention uses secret key algorithms, but it must be understood that it is not limited to this type of algorithm.

For example, after the user has identified himself or herself to the verification unit, an authentication procedure using a secret key algorithm entails encrypting a variable in parallel in the card 2 and in the verification unit 3 by means of the algorithm and a shared secret key $K_{SEA}$ and then comparing the two passwords $A_{SEA}$ resulting from the encryption of that variable, generally in the verification unit 3. In systems referred to as asynchronous systems the variable is a random number (challenge) generated by the verification unit 3 and transmitted to the card 2. In systems referred to as synchronous systems the variable is dynamic, i.e. it is a number which changes in the card 2 and the unit 3 as a function of the content of a clock counter and/or an event counter. Synchronous systems presuppose, subject to a particular tolerance, a match between the contents of the clock counters and/or event counters of the card 2 and the content at the address associated with the card 2 of a database which is part of the verification unit 3 or to which the latter unit has access for implementing the authentication process. Detailed examples of these authentication mechanisms are given in U.S. Pat. Nos. 5,136,644 and 5,737,421, for example, which are incorporated herein by reference.

As previously indicated, the secret encryption and/or decryption key(s) stored in the card 2 and the server 15 can be static, i.e. they can retain the same value throughout the service life of the product, or dynamic, i.e. their value can change with time. The value of the dynamic keys can itself be a function of the content of the clock and/or event counters, as described for example in U.S. Pat. No. 5,937,068 which is incorporated herein by reference.

Whether the key is a static key or a dynamic key, it is necessary during the phase of initializing the production parameters or personalizing parameters of the card 2 to load into the programmable memory 9 thereof an initial value that will constitute the static key, the initial dynamic key or a root enabling the initial dynamic key to be calculated. In a system including a large number of cards, for example several thousand to several tens of thousands, administering one or more secret keys specific to each card and different from those of all the other cards causes security problems. It is desirable for the end user of the card to be assured that the security offered by the card cannot be compromised by programming operations performed on the upstream side by the entity or entities responsible for initializing the production parameters and/or personalizing parameters of the card.

These security problems are accentuated by the current expansion of secure communication systems which must be able to respond to requirements related to the multiplicity of applications and the multiplicity of security levels for an application. For example, for a security system of given configuration, i.e. a set of cards and associated software installed in the cards 2 and the verification units 3 in order to perform particular functions, the same card can be used for different applications, for example authentication vis-à-vis a data processing or similar network to obtain access to one or more resources of that network (access to each resource may require separate authentication), telepurchasing, etc. Moreover, there may be several security levels for the same application, for example according to different categories of users, with the result that the cards have to be personalized according to their end user.

The multiplicity of applications for the same security system and of security levels for the same application, combined with the various phases of the life of the system between its manufacture and its supply to the end user, means that there can be for the same system, simultaneously or not, a plurality of administrators responsible for administering security problems.

Considering a simple case in which the security system includes only one application, a card can circulate during its life cycle between a number of entities, namely:

the manufacturer or the supplier who sells the security system to the client;

a general administrator, who can be the security manager of the client, which can have several geographical sites, each site having its own security system administration organization, independent of that of other sites;

local administrators each responsible for the organization of the security system of the business at the level of one geographic site; and end users each of whom will hold a card 2 and use it on one or more particular geographical sites.

Once a batch of cards has been sold to a client by the supplier or the manufacturer, administering a system of this kind presupposes that only the general administrator can use the batch of cards and that another client cannot use them. Thus:

on the one hand, the manufacturer or the supplier must during production initialize a number of parameters common to a batch of cards for a given client who alone will be able to initialize his personalizing parameters in the cards; and personalization by the client must be irreversible: once the general administrator has personalized the cards, they must no longer be usable by the supplier or the manufacturer.

Once in possession of the batch of cards the general administrator initializes all the personalizing parameters common to all the sites in the cards. The cards are then distributed to various sites on each of which a local administrator initializes the personalizing parameters specific to the site concerned. If cards have to be used and recognized on more than one site, they are handed over to a first local administrator for initializing the personalizing parameters of the first site, then to a second local administrator for initializing the personalizing parameters of the second site, and so on. In this context, it is necessary to assure the independence of the administration means, in other words:

a local administrator X must be able to initialize only the personalizing parameters of site X: being able to initialize the personalizing parameters of site X does not make it possible to initialize the personalizing parameters of site Y or to know the personalizing parameters of site Y; and to assure that administration at each site is autonomous, being the general administrator must not imply a knowledge of the personalizing parameters of the various sites.

These various functions are implemented by means of mechanisms for initializing production parameters and personalizing parameters described next with reference to FIGS. 2 to 4.

Figure 2:
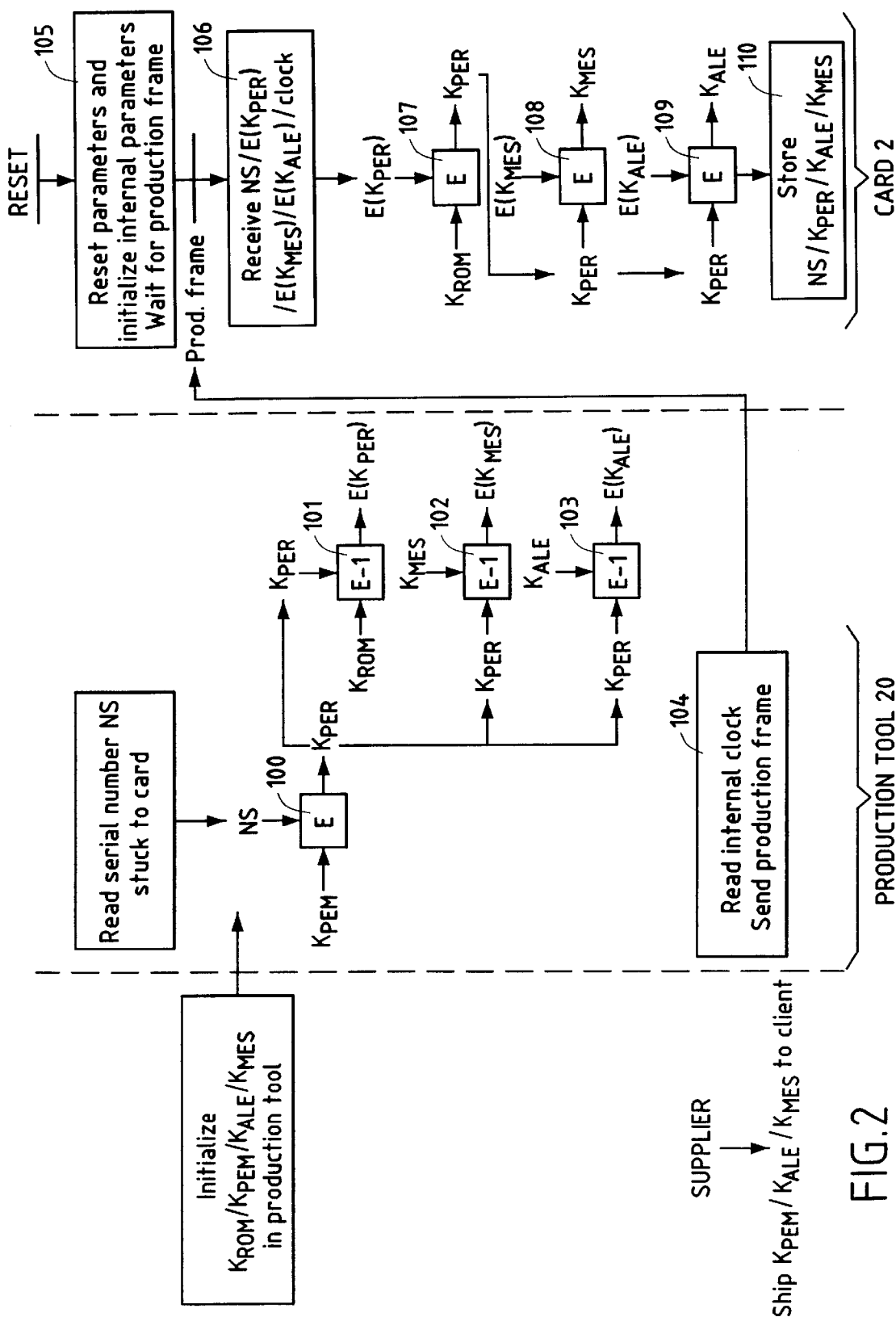
FIG. 2 is a diagram showing mechanisms for initializing parameters of the portable electronic device which is part of the system from FIG. 1 during production.

FIG. 2 is a diagram showing in-production mechanisms for initializing data or parameters, referred to hereinafter as production parameters, which are common to a batch of cards for a given client. In the figure, the lefthand column shows the operations performed by the supplier of the card, i.e. the entity which is responsible for supplying the security system to the client. The middle column shows the operations performed by a tool 20 for manufacturing the cards 2, the manufacturer being the same entity as the supplier or not. Finally, the righthand column shows the operations implemented in the card 2. The production tool 20 used by the manufacturer includes conventional hardware and software that there is no need to describe here and which are used, among other things, to generate data and to transmit it to the cards 2 to program their programmable memory 9.

The lefthand column in FIG. 2 shows a number of secret keys $K_{ROM}$, $K_{PEM}$, $K_{ALE}$ and $K_{MES}$ which are common to an entire batch of cards for a given client.

The key $K_{ROM}$ is defined by the supplier and is known only to the supplier. The key $K_{ROM}$ is installed in the permanent read-only memory 8 of the cards when masking the integrated circuits but is not known to the manufacturer of the cards 2 if this is not the same entity as the supplier. To this end, it can be embedded in encrypted form in the software controlling the card production tool, for example.

The supplier also chooses the keys $K_{PEM}$, $K_{ALE}$ and $K_{MES}$ and enters them in encrypted form in the software controlling the production tool. The values of these three keys are communicated confidentially to the client, preferably separately from the batch of cards. The key $K_{PEM}$ is a master personalizing key which, as described below, is used to generate a personalizing key specific to each card according to its serial number. The key $K_{ALE}$ is a key enabling the cards to generate challenges and the key $K_{MES}$ is a key enabling an alphabet and messages to be loaded into the cards.

As shown in the centre column in FIG. 2, the production tool 20 reads the serial number NS associated with a given card and an algorithm submits the number NS to an encryption operation E using the master personalizing key $K_{PEM}$ (block 100). The result of this encryption is a specific personalizing key $K_{PER}$ which is specific to the card and is submitted by means of an algorithm and the key $K_{ROM}$ (block 101) to an inverse operation E−1 to produce a datum $E(K_{PER})$. The key $K_{PER}$ is used in blocks 102 and 103 to generate data $E(K_{MES})$ and $E(K_{ALE})$ from the keys $K_{MES}$ and $K_{ALE}$, respectively, using the inverse operation E−1. In the foregoing description, and in the subsequent description, if $B=E[K_X](A)$ is the result of the encryption E of a datum A by means of a key $K_X$, E−1 represents the inverse operation $A=E-1[K_X](B)$ enabling the datum A to be obtained at the output, by means of the key $K_X$, by applying to the input the key for encrypting the datum B.

For a given card 2, the production parameters (block 104) include the serial number NS, the output data of blocks 101, 102 and 103 and the status of an internal clock counter of the production tool enabling initialization of a clock counter of the card 2, in particular if the system uses dynamic keys and/or variables.

After the parameters have been reset to zero and the internal parameters of the card 2 concerned have been initialized, the card waits to receive a production frame (block 105). In step 106 the card 2 receives the production frame consisting of the data previously listed (block 104). By means of the software programmed into it, the microcontroller 7 then calculates (block 107) the key $K_{PER}$ from the datum $E(K_{PER})$ and the key $K_{ROM}$, using operation E. It also uses operation E to calculate (block 108) the key $K_{MES}$ from the datum $E(K_{MES})$ and the key $K_{PER}$ and (block 109) the key $K_{ALE}$ from the datum $E(K_{ALE})$ and the key $K_{PER}$.

In step 110 the serial number NS and the keys $K_{PER}$, $K_{ALE}$ and $K_{MES}$ are stored in memory and the card is ready to be sent to a client to be personalized.

In the process described above, it is sufficient to know the format of the production frame (block 104) to load parameters into a card because this operation does not require an access code. However, a pirate in possession of the format of the production frame would nevertheless be unable to personalize and use the card because he or she would not know the key $K_{ROM}$.

Figure 3:
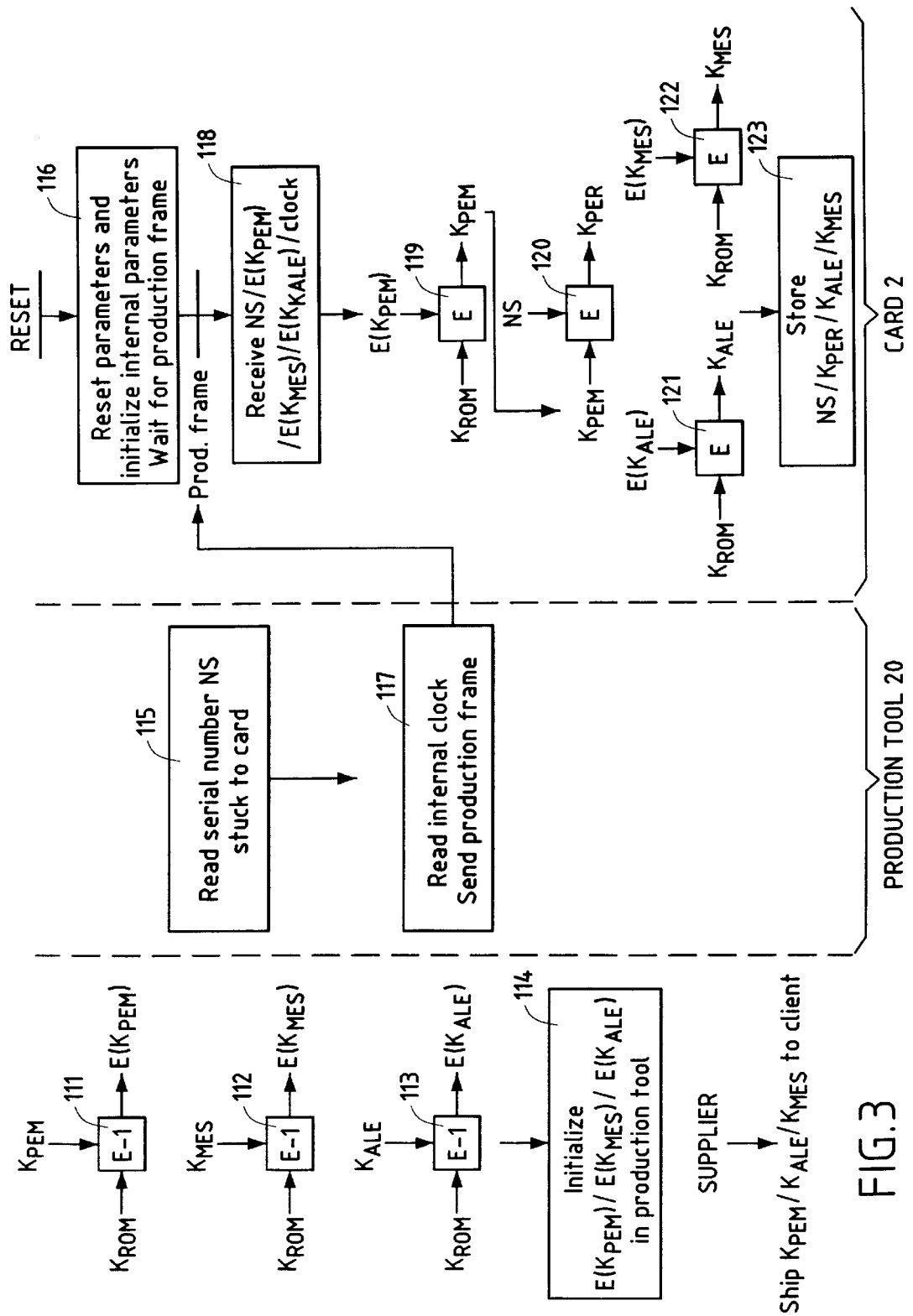
FIG. 3 is a diagram showing a variant of the mechanisms for initializing parameters of the portable electronic device which is part of the system from FIG. 1 during production.

FIG. 3 shows a variant of the process for initializing the production parameters which has the advantage of not introducing the keys $K_{ROM}$ and $K_{PEM}$ into the software for initializing the production parameters of the production tool 20. To this end, by means of its own software, the supplier (lefthand column) calculates the data $E(K_{PER})$, $E(K_{MES})$ and $E(K_{ALE})$ from the data $K_{PER}$, $K_{MES}$ and $K_{ALE}$ respectively, and the key $K_{ROM}$. After calculating this data by an operation E−1 (blocks 111, 112 and 113), the supplier introduces the data into the software for initializing the production parameters of the production tool (step 114).

After the tool 20 has read the serial number of the card concerned (step 115) and the parameters have been reset to zero and the internal parameters of the card have been initialized (step 116), the production tool 20 transmits the production parameters to the card (step 117): these parameters are the serial number NS, the data E−1($K_{PER}$), E−1 ($K_{MES}$) and E−1($K_{ALE}$), and the status of the internal clock counter. After receiving the corresponding frame (step 118), the microcontroller 6 uses operation E to calculate the key $K_{PEM}$ from the datum E($K_{PEM}$) and the key $K_{ROM}$ (step 119). It then calculates the personalizing key $K_{PER}$ specific to the card using operation E, the data NS and the master personalizing key $K_{PEM}$(step 120). Finally, the microcontroller 7 uses operation E to calculate the keys $K_{ALE}$ and $K_{MES}$ from the data E($K_{ALE}$) and E($K_{MES}$), respectively, and the key $K_{ROM}$ stored in the permanent memory 8 of the card (steps 121 and 122). In step 123 the data NS, $K_{PER}$, $K_{ALE}$ and $K_{MES}$ is stored in the programmable memory 9 of the card 2. This data is the same as that obtained by the process of initializing the production parameters described with reference to FIG. 2.

When the production parameters of a batch of cards from a given client have been initialized in this way, they are shipped to the client. The keys common to this batch, namely the master personalizing key $K_{PEM}$, the key $K_{ALE}$ for generating challenges and the key $K_{MES}$ for loading the alphabet and messages, are communicated confidentially to the client. Each card holds in memory the keys $K_{ALE}$ and $K_{MES}$ which are common to the batch of cards and the key $K_{PER}$ and the serial number NS specific to it.

Furthermore, each card 2 holds in memory a code or number identifying the version of the software mask-programmed into the integrated circuits of the card. The software version can vary from one batch of cards to another and within the same batch of cards for a given client there may be several groups of cards with different versions of the software on the basis of requirements expressed by the client as to the use of the cards. The code or number identifying each version of the software programmed in the cards shipped to the client is supplied to the client by the supplier. The client also has software for personalizing cards according to the version of the software programmed therein.

Figure 4:
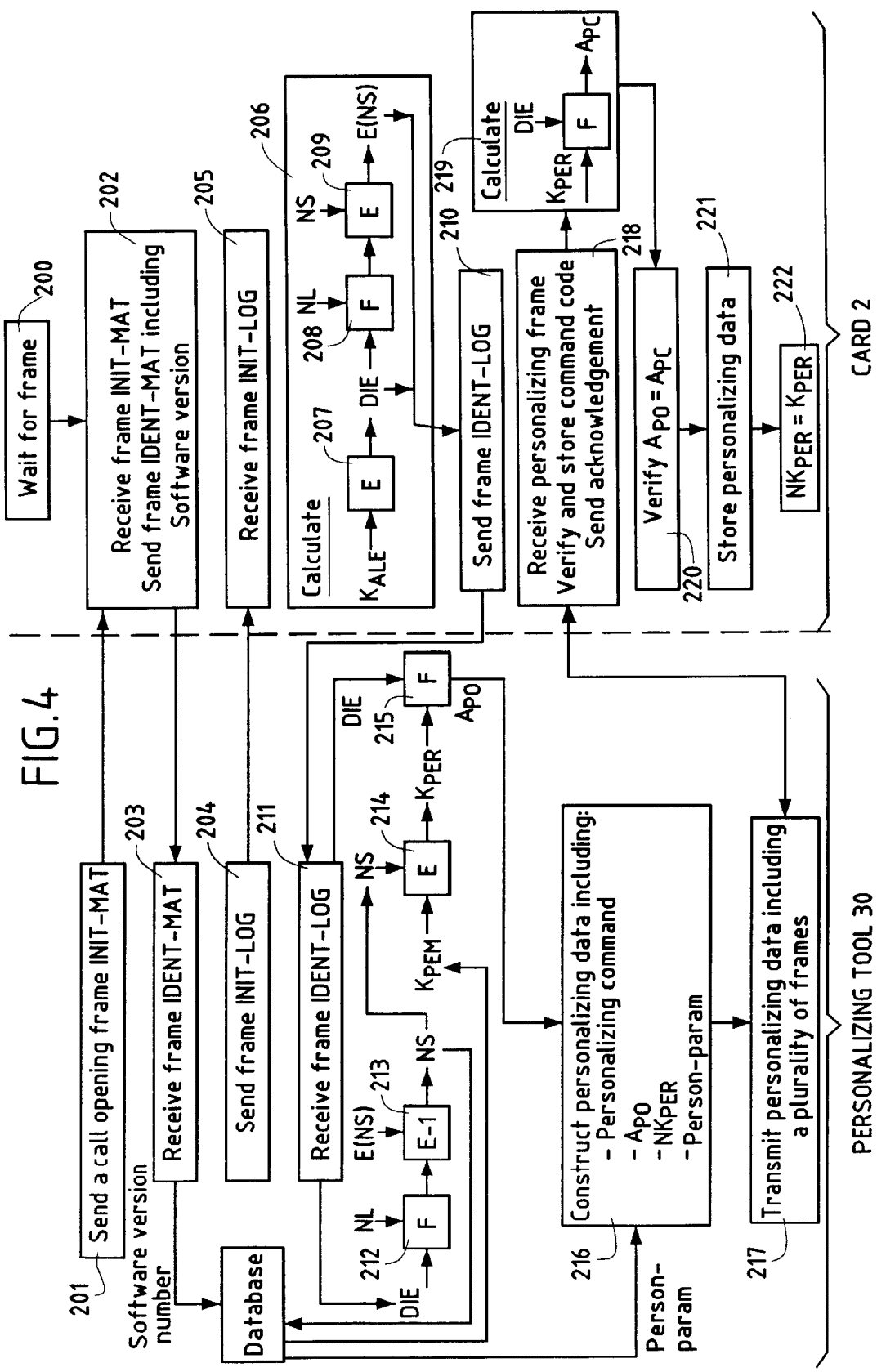
FIG. 4 is a diagram showing mechanisms for initializing personalizing parameters of the portable electronic device which is part of the system from FIG. 1.

FIG. 4 shows the process of personalizing the cards 2 by the client. The lefthand column represents the operations performed by a personalizing tool 30 and the righthand column shows the operations performed in the cards 2. The personalizing tool 30 has a structure similar to that of the verification unit 3, i.e. it includes means for communication with the cards 2, a data processor, memories containing in particular the software needed to personalize the cards according to the version of the software programmed therein, and a database containing the values of the keys $K_{PEM}$, $K_{ALE}$ and $K_{MES}$ and the personalizing parameters to be loaded into the cards 2 according to the version of the software programmed therein.

In FIG. 4, in step 200, the card is awaiting a call or communication opening frame from the personalizing tool. In step 201 the personalizing tool opens communication with the card to be personalized and sends the communication opening frame INIT-MAT. In step 202 the card receives the communication opening frame INIT-MAT and sends the personalizing tool an identification frame IDENT-MAT including the code or number of the version of the software it contains. In step 203 the personalizing tool 30 receives the identification frame IDENT-MAT and the software version number is input to the database to read therein, among other things, the personalizing parameters to be loaded into the card. In step 204 the personalizing tool 30 sends a software initialization frame INIT-LOG which the card receives in step 205, and then proceeds to step 206.

In step 206 the card uses the operation E to calculate a challenge by means of the key $K_{ALE}$ (block 207) and then the datum E(NS) by encrypting the serial number NS of the card using a key which is itself the result of encrypting by means of a logic function F the version number NL of the software using the challenge calculated in step 207. After these encryption operations 208 and 209, the card sends an identification frame IDENT-LOG containing the challenge and E(NS) (step 210). The personalizing tool 30 receives this frame in step 211 and, by means of an operation F in step 212 on the number NL using the challenge transmitted from the card and an operation E−1 in step 213 on E(NS) by means of the result of the operation effected in step 212, generates the serial number NS of the card. The serial number NS of the card being personalized is input to the database to enable the client to retain a table of personalizing data for each card. In step 214 the personalizing tool calculates the key $K_{PER}$ specific to the card by an operation E of encrypting the serial number NS by means of the master personalizing key $K_{PEM}$ which is supplied by the database of the tool 30. The tool then calculates (step 215) an authentication password $A_{PO}$ (which constitutes the access code to personalizing the card) by an operation F which encrypts the challenge by means of the key $K_{PER}$: $A_{PO}=F[K_{PER}]$ (Challenge).

In step 216, the personalizing tool constructs the personalizing data common to the card from the password calculated in step 215 and personalizing parameters received from the database. The common personalizing data includes personalizing command codes, the password $A_{PO}$ authenticating the personalizing tool, a new secret personalizing key $NK_{PER}$ specific to the card and to be substituted for the initial personalizing key $K_{PER}$, and various personalizing parameters, including, for example, one or more secret keys $K_{SEA}$ for calculating the authentication password $A_{SEA}$ vis-à-vis the verification unit 3 ($A_{PEA}=E[K_{SEA}]$ (Challenge), and secondary or particular secret personalizing keys $K_{PERX}$, $K_{PERY}$, etc specific to each site X, Y, etc for which the card has to be personalized.

In step 217, the personalizing data is transmitted to the card in the form of several frames.

In step 218, the card receives the personalizing frames, verifies the personalizing command codes, stores the received data and sends an acknowledgement to the personalizing tool.

In step 219, the card calculates a code or password $A_{PC}$ for verifying the authentication password $A_{PO}$ by encrypting the challenge using the logic function F and the specific personalizing key $K_{PER}$ stored in its memory in step 110 or 123: $A_{PC}=F[K_{PER}]$ (Challenge).

In step 220, the card verifies that the authentication password $A_{PO}$ received from the personalizing tool 30 is consistent with the verification password $A_{PC}$ calculated by the card and, if so, stores the personalizing data in step 221: for example, consistency can consist in the fact that the two passwords are identical, as shown in FIG. 4, or that the two passwords are linked by another predetermined relationship.

Finally, in step 222 the card substitutes the new personalizing key $NK_{PER}$ received from the personalizing tool for the old key $K_{PER}$. The new key $NK_{PER}$ is not known to the supplier, who is thereafter unable to access the personalizing data of the client. Read and/or write mode access to the personalizing data requires the personalizing tool to supply the card with a new authentication password $NA_{PO}=F[NK_{PER}]$ (Challenge) consistent with the verification password $NA_{PC}$ calculated in the card as explained with reference to step 219, $NA_{PO}$ and $NA_{PC}$ being calculated on the basis of a new challenge generated in the card and transmitted to the personalizing tool.

However, a knowledge of the common secret personalizing key $NK_{PER}$ does not make it possible to read secondary personalizing secret keys $K_{PERX}$, $K_{PERY}$, etc loaded into the card in step 221, or any other secret key.

This is because the secret keys cannot be read because the program of the microcontroller 7 does not include any command for reading these parameters.

After step 222, the general administrator can transmit the cards to the local administrators of sites X, Y, etc., each of whom will be able, using respective secondary keys $K_{PERX}$, $K_{PERY}$, etc, and a process similar to that shown in FIG. 4, and which does not need to be described again in detail, to load the card with the personalizing parameters specific to the site for which he or she is responsible. To this end, the secondary key specific to personalizing the card for each site is communicated confidentially by the general administrator to the local administrator concerned.

Using the secondary key communicated to him or her, the local administrator loads the card with the personalizing data specific to the site concerned, for example an authentication key for calculating an authentication password vis-á-vis a verification unit of that site. Thus the local administrator of site X can load an authentication key $K_{SEAX}$, the local administrator of site Y can load an authentication key $K_{SEAY}$, and so on. During the process of personalizing the card for a given site X, the local administrator can substitute a new secondary personalizing key $NK_{PERX}$ for the secondary personalizing key $K_{PERX}$ in the card received from the general administrator for the site concerned, as described with reference to FIG. 4. This will prevent general administrators having access in read and/or modify mode to the personalizing parameters of cards whose secondary personalizing key has been modified. Modifying the secondary keys also provides a seal between the various segments or functions of the card. Modifying the secondary keys $K_{PERX}$, $K_{PERY}$, etc (replaced by $NK_{PERX}$, $NK_{PERY}$, etc) protects against hacking with the aim of writing other secret data into the segments. The effect of this type of hacking is limited because it is not possible to read the secret data even if the corresponding secondary secret personalizing key is known. However, exclusive access to personalizing each segment is guaranteed, as is exclusive access to the common personalizing data with the key $K_{PER}$, $NK_{PER}$.

After the segments have been personalized by means of the secondary keys $K_{PERX}$, $K_{PERY}$, $NK_{PERX}$, $NK_{PERY}$, it is preferred that the key $K_{PER}$, $NK_{PER}$ specific to the card enables them to be overwritten in order to perform a new process of initializing all the personalizing parameters of the card, if necessary. This facility can be useful in the event of an anomaly, to prevent the device being rendered permanently unusable.

However, in one variant, this possibility can be prohibited.

Figure 5:
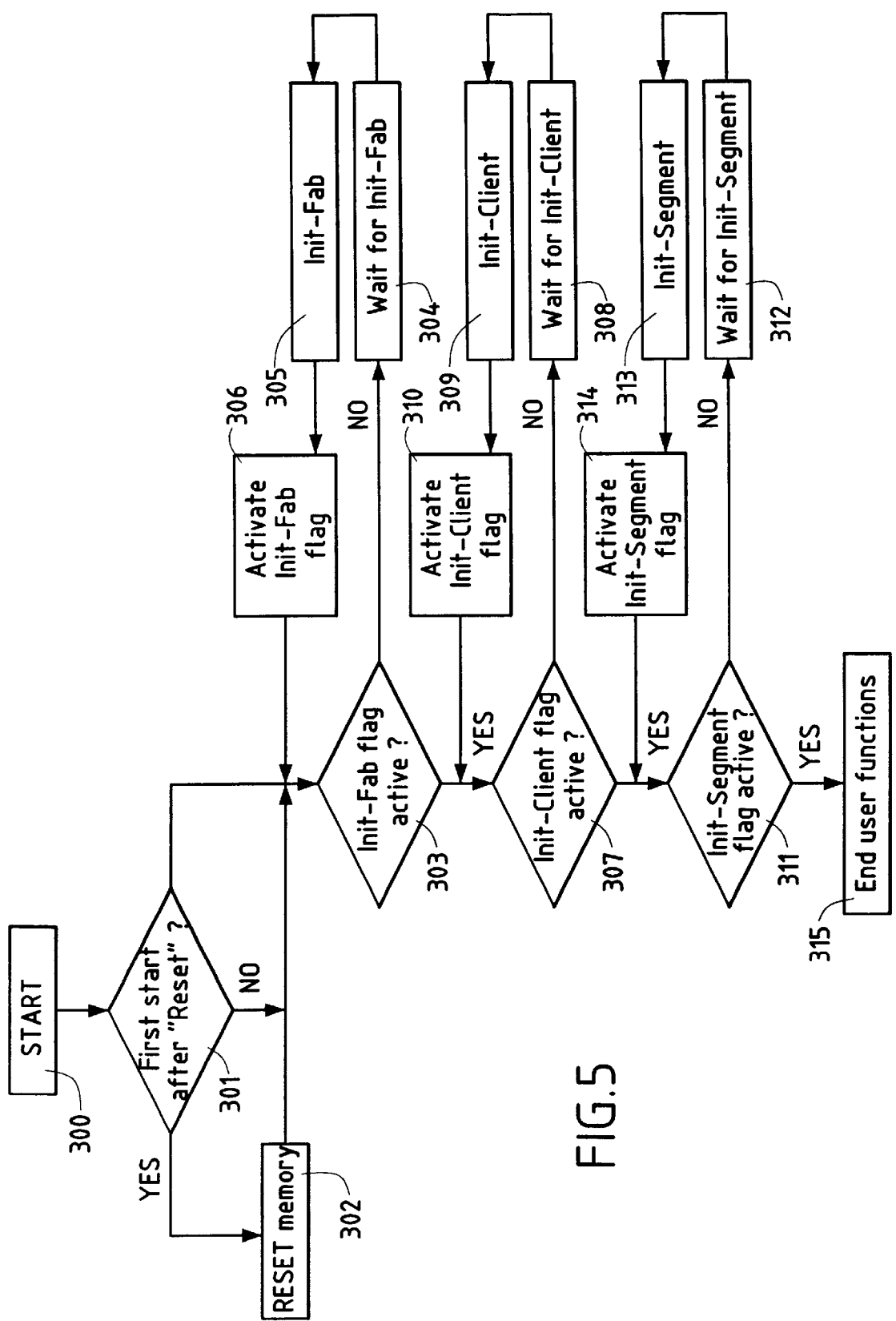
FIG. 5 is a general block diagram synthesizing the various phases of initializing the portable electronic device which is part of the system from FIG. 1.

FIG. 5 is a general flowchart showing the main phases of the program that executes in a card 2 provided with a plurality of segments which, after the common personalizing parameters have been initialized, must be initialized with personalizing parameters that are specific to them in order to use the functions specific to each segment by means of the card.

The program starts in step 300 and in step 301 a test is performed to determine if this is the first start since a reset.

If so, the memory is reset to zero in step 302, after which a test is performed in step 303 to determine if a flag representative of initialization of the parameters during production (parameters initialized by the manufacturer) is active. If the response to the test in step 301 is negative, the next step is a test step 303.

If the response to test step 303 is negative, the program waits for initialization of the production parameters (step 304). The next step 305 corresponds to initialization of the production parameters in the card 2, as described with reference to FIGS. 2 and 3. When this initialization has been completed, a flag is activated in step 306 and the program goes back to the entry of test step 303.

If the response to test step 303 is positive, i.e. if the production parameters have been initialized, the program runs a test step 307 to determine if a flag representative of initialization by the client of the common personalizing parameters is active. If not, the program waits for initialization of the common personalizing parameters (step 308). The next step 309 corresponds to initialization of the common personalizing parameters in the card 2, as described with reference to FIG. 4. The common personalizing parameters include the reprogrammable personalizing keys $K_{PERX}$, $K_{PERY}$ specific to each segment or function. When this initialization has been completed, a flag is activated in step 310 and the program returns to the entry of test step 307.

If the response to test step 307 is positive, the program moves on to a test step 311 to determine if a flag representative of initialization of personalizing parameters specific or particular to the various segments of the card is active. If not, the program waits for initialization of the personalizing parameters particular to the segments (step 312). Step 313 corresponds to initialization in the card 2 of the personalizing parameters particular to the segments. For each segment, this initialization is subordinate to the supply to the card of a correct access code $A_{PX}$, $A_{PY}$ dependent on the key $K_{PERX}$, $K_{PERY}$ allocated to that segment and a challenge supplied by the card to the personalizing tool, as described with reference to FIG. 4. As appropriate, this initialization is performed by the general administrator or by the local administrators at the various geographical sites, as previously described. During this process of initializing the particular personalizing parameters, the responsible administrator can substitute a new particular personalizing key $NK_{PERX}$, $NK_{PERY}$ for the initial personalizing key $K_{PERX}$, $K_{PERY}$ for the segment concerned, which was loaded in step 309. Only the holder of the new key $NK_{PERX}$, $NK_{PERY}$ can generate the new access code $NA_{PX}$, $NA_{PY}$ and subsequently access (in read mode and/or in write mode, depending on how the processing means are programmed) the personalizing data particular to the corresponding segment and the holder of the specific personalizing key $K_{PER}$ (or $NK_{PER}$ if it has been modified) does not have access thereto if he or she does not know the new particular personalizing key.

When the initialization of the personalizing parameters of all the segments has been completed, a flag is activated in step 314, the response to test step 311 is positive and the program moves on to step 315 which represents access for the end user to the various functions of the card implemented by the program of the card.

As previously indicated, the invention is not limited to the use of symmetrical algorithms using secret keys and applies equally if the mechanisms for initializing the parameters of the card use asymmetric algorithms employing public and private keys. In this case, the public key is stored in the card or device 2, the challenge is generated in the device 2 and the private key is stored in a personalizing tool or a smart card used by the personalizing tool.

However, using asymmetric algorithms does not allow derivation of keys since the concept of a mother key does not exist in this type of algorithm.

Also, it goes without saying that the embodiments described are merely examples and can be modified, in particular by substitution of equivalent technical means, without departing from the scope of the invention.

What is claimed is:

1. Portable electronic device for secure communication with at least one electronic unit for use of a plurality of functions, including:

data storage means, interface means with at least one external tool for loading data into said storage means, data processing means including initialization means for enabling, in response to the application of a secret personalizing access code specific to said device, modification of said specific secret personalizing access code and loading of personalizing data into said storage means, first loading means controlled by said specific secret personalizing access code for loading into said storage means reprogrammable particular secret data respectively representative of different particular secret personalizing access codes, each said particular secret personalizing access code being assigned to personalizing in said device a particular one of said functions, second loading means controlled by said particular secret personalizing access codes for loading into said storage means particular personalizing data assigned to the implementation of said functions by said processing means, and inhibitor means for authorizing, for each said functions, only in response to the application of one said particular secret personalizing access codes already assigned to said function, (i) modification of one said reprogammable particular secret data loaded into said storage means and representative of said particular secret personalizing access code and (ii) said loading of said particular personalizing data.

2. Device according to claim 1, wherein said inhibitor means comprise means to prohibit read mode access to any of said secret data.

3. Device according to claim 1, wherein said inhibitor means comprise means to prohibit read mode and write mode access by said processing means to said particular personalizing data by means of said specific secret personalizing access code.

4. Device according to claim 1, wherein said inhibitor means comprise means to prohibit read mode access to said particular personalizing data following the loading of said data by means of said particular secret personalizing access codes assigned to said functions.

5. Device according to claim 1, wherein said inhibitor means comprise means to authorize, for each said functions, read mode access to said particular personalizing data assigned to the implementation of said function by means of one said particular secret personalizing access codes assigned to said function.

6. Device according to claim 1, wherein said processing means comprise means to authorize, by means of said specific secret personalizing access code, the deletion of said reprogramable particular secret data and of said particular personalizing data once loaded into said storage means and the loading of new reprogrammable particular secret data.

7. Device according to claim 1, wherein said specific secret personalizing access code is an access code for loading into said storage means common personalizing data which are common to all said functions of said device.

8. Device according to claim 1, wherein it includes third loading means for loading into said storage means a reprogrammable specific secret datum representative of said specific secret personalizing access code, said initialization means comprising means to authorize the replacement of said reprogrammable specific secret datum by a new specific secret datum representative of a new specific secret personalizing access code only in response to the application to said processing means of said specific secret personalizing access code imaging said reprogrammable specific secret datum to be replaced.

9. Device according to claim 8, wherein said storage means include at least one non-volatile memory in which a base secret key is stored and said initialization means include first calculating means for calculating an initial value of said reprogrammable specific secret datum as a function of said base secret key and of an initial secret parameter.

10. Device according to claim 1, wherein each said secret datum is a calculation secret key for calculating a verification code for verifying one of said personalizing access codes applied to said device.

11. Device according to claim 10, wherein said processing means include second calculating means for calculating said verification code by encrypting a variable by means of said calculation secret key.

12. Device according to claim 1, wherein said particular personalizing data includes at least one plurality of authentication secret keys which are different from each other and each of which is assigned to one of said functions and said processing means include calculating means for calculating an authentication code vis-á-vis a verification unit as a function of one of said authentication secret keys.

13. Method of initializing a portable electronic device for secure communication with at least one electronic unit for use of a plurality of functions, said portable electronic device including:

data storage means, interface means with at least one external tool for loading data into said storage means, data processing means including initialization means for enabling, in response to the application of a secret personalizing access code specific to said device, modification of said specific secret personalizing access code and loading of personalizing data into said storage means, first loading means controlled by said specific secret personalizing access code for loading into said storage means reprogrammable particular secret data respectively representative of different particular secret personalizing access codes and each assigned to personalizing in said device a particular one of said functions, second loading means controlled by said particular secret personalizing access codes for loading into said storage means particular personalizing data assigned to the implementation of said functions by said processing means, and inhibitor means for authorizing, for each said functions, only in response to the application of one said particular secret personalizing access codes already assigned to said function, (i) modification of one said reprogrammable particular secret data loaded into said storage means and representative of said particular secret personalizing access code and (ii) said loading of said particular personalizing data, wherein said method includes:

an initialization step of defining and storing in said storage means a reprogrammable specific personalizing secret key specific to said device, a first personalizing step of loading into said storage means, by means of said specific secret personalizing access code dependent on said reprogrammable specific personalizing secret key, common personalizing data which are common to said functions and reprogrammable particular secret keys for calculating said particular secret personalizing access secret codes each assigned to one of said functions, and a second personalizing step of loading said particular personalizing data relating to each said functions into said storage means by means of said particular secret personalizing access code assigned to personalizing said function.

14. Method according to claim 13, wherein said second personalizing step includes a phase consisting in, when loading said particular personalizing data relative to at least one of said functions, modifying said reprogrammable particular secret key for calculating said particular secret personalizing access code assigned to said function.

15. Method according to claim 13, wherein said initialization step includes:

at least one first initialization phase consisting in defining at least one common secret datum which is common to a set of devices intended for a same entity, at least one second initialization phase including the steps of, for each device of said set:

a) reading a specific identification datum carried by said device, b) calculating a first specific personalizing secret key as a function of said common secret datum and said specific identification datum, c) storing said specific identification datum and said first specific personalizing secret key in said storage means.

16. Method according to claim 15, wherein said first pesonalizing step includes the following steps, for each device of said set:

a) extracting said specific identification datum from said device, b) calculating in a first external tool said first specific personalizing secret key as a function of said common secret datum and said specific identification datum, c) calculating in said first external tool a first specific secret personalizing access code as a function of said first specific personalizing secret key and a challenge transmitted by said device, d) transmitting from said first external tool to said device said first specific secret personalizing access code with personalizing parameters including a second specific personalizing secret key different from said first specific personalizing secret key, e) calculating in said system a verification code as a function of said first specific personalizing secret key and said challenge for verifying said first specific secret personalizing access code received from said first external tool, f) comparing in said device said first specific secret personalizing access code and said verification code and, in response to a match of said codes:

g) storing said personalizing parameters in said storage means, and h) substituting said second specific personalizing secret key for said first specific personalizing secret key in said storage means.

17. Method according to claim 15, wherein said initialization step includes a third initialization phase consisting in initially storing a common base secret key in a permanent memory of said storage means and wherein steps a) and b) of said second initialization phase comprise:

applying said common secret datum and said common base secret key to a second external tool, reading said specific identification datum by means of said second external tool, calculating said specific personalizing secret key by means of said second external tool, encrypting said specific personalizing secret key by means of said common base secret key in said second external tool, transmitting the result of said encryption from said second external tool to said device, and decrypting said result in said device by means of said common base secret key to reconstitute said specific personalizing secret key.

18. Method according to claim 15, wherein said initialization step includes a third initialization phase consisting in initially storing a common base secret key in a permanent memory of said storage means, said first initialization phase equally consists in encrypting said common secret datum by means of said common base secret key and applying the result of said encryption to a second external tool, and said second initialization phase equally comprises:

a) reading said specific identification datum by means of said second external tool and transmitting said specific identification datum and the result of said encryption to said device, b) decrypting said result in said device by means of said common base secret key to restore said common secret datum and thereafter calculating said specific personalizing secret key.

19. Secure communication system comprising:

(a) a set of portable electronic devices for secure communication with at least one electronic unit for use of a plurality of functions, each said portable electronic device including:

data storage means, interface means with at least one external tool for loading data into said storage means, data processing means including initialization means for enabling, in response to the application of a secret personalizing access code specific to said device, modification of said specific secret personalizing access code and loading of personalizing data into said storage means, first loading means controlled by said specific secret personalizing access code for loading into said storage means reprogrammable particular secret data respectively representative of different particular secret personalizing access codes and each assigned to personalizing in said device a particular one of said functions, second loading means controlled by said particular secret personalizing access codes for loading into said storage means particular personalizing data assigned to the implementation of said functions by said processing means, and inhibitor means for authorizing, for each said functions, only in response to the application of one said particular secret personalizing access codes already assigned to said function, (i) modification of one said reprogammable particular secret data loaded into said storage means and representative of said particular secret personalizing access code and (ii) said loading of said particular personalizing data, and (b) at least one external tool for initializing personalizing parameters for loading into each of said devices:
common personalizing data which are common to said functions of said device,
said particular personalizing data, and
said reprogrammable particular secret data.

20. Secure communication system according to claim 19, wherein it further includes a production tool for the initial loading into each of said devices of a reprogrammable secret datum specific to each said devices and representative of said specific secret personalizing access code.

21. Secure communication system comprising:
(a) a set of portable electronic device for secure communication with at least one electronic unit for use of a plurality of functions, each said portable electronic device including:
data storage means,
interface means with at least one external tool for loading data into said storage means,
data processing means including initialization means for enabling, in response to the application of a secret personalizing access code specific to said device, modification of said specific secret personalizing access code and loading of personalizing data into said storage means,
first loading means controlled by said specific secret personalizing access code for loading into said storage means reprogrammable particular secret data respectively representative of different particular secret personalizing access codes and each assigned to personalizing in said device a particular one of said functions,
second loading means controlled by said particular secret personalizing access codes for loading into said storage means particular personalizing data assigned to the implementation of said functions by said processing means, said personalizing data including at least one plurality of authentication secret keys which are different from each other and each of which is assigned to one of said functions, and
inhibitor means for authorizing, for each said functions, only in response to the application of one said particular secret personalizing access codes already assigned to said function, (i) modification of one said reprogammable particular secret data loaded into said storage means and representative of said particular secret personalizing access code and (ii) said loading of said particular personalizing data, and (b) at least one verification unit,
wherein said processing means include calculating means for calculating an authentication code vis-á-vis said verification unit as a function of one of said authentication secret keys.

* * * * *